3,097,197
1-(DIHALOGEN-TRIAZINYLAMINOPHENYL)-4-(β-NAPHTHYLAZO)PYRAZOLONE DYESTUFFS
Colin George Tilley and Frederick Andrew Waite, Manchester, England, assignors to Imperial Chemical Industries Limited, London, England, a corporation of Great Britain
No Drawing. Filed Nov. 6, 1959, Ser. No. 851,223
Claims priority, application Great Britain Nov. 14, 1958
1 Claim. (Cl. 260—153)

This invention relates to new azo dyestuffs and more particularly it relates to new azo dyestuffs which are valuable for colouring cellulose textile materials.

According to the invention there are provided the new dyestuffs which, in the form of the free acids, are represented by the formula:

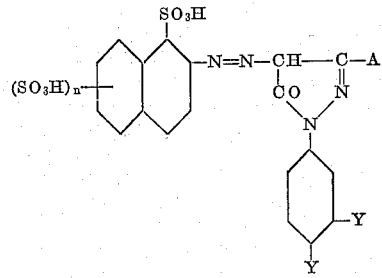

wherein $n$ represents 0, 1 or 2, A represents an alkyl radical or a carboxylic acid, carboxylic acid ester, carbamyl or substituted carbamyl group, one Y represents a hydrogen atom or a sulphonic acid group and the other Y represents a group of the formula:

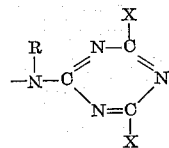

wherein R represents a hydrogen atom or an alkyl radical, X represents a chlorine or a bromine atom, and the benzene nucleus may be substituted by atoms or groups other than hydroxy, amino and substituted amino groups.

As examples of the alkyl radicals represented by A there may be mentioned lower alkyl radicals such as methyl and ethyl radicals. As examples of the carboxylic acid ester groups represented by A there may be mentioned carbo lower alkoxy groups such as carbomethoxy, carbethoxy, carbopropoxy and carbobutoxy groups and carboaryloxy groups for example carbo monocyclic aryloxy groups such as carbophenoxy. As examples of the substituted carbamyl groups represented by A there may be mentioned N-methylcarbamyl, N:N-dimethylcarbamyl, N-ethylcarbamyl, N:N-diethylcarbamyl, N-phenylcarbamyl, N-methyl-N-phenylcarbamyl, N-β-hydroxyethylcarbamyl and N:N-di(β-hydroxyethyl)carbamyl.

It is preferred that A represents a carboxylic acid groups or a lower alkyl radical, preferably a methyl radical.

As examples of the alkyl radicals represented by R there may be mentioned lower alkyl radicals such as methyl, ethyl, propyl and butyl, and as examples of the substituents which may be present in the benzene nucleus there may be mentioned halogen atoms for example chlorine, alkyl radicals for example lower alkyl radicals such as methyl, alkoxy radicals for example lower alkoxy radicals such as methoxy, nitro, carboxy and sulpho groups.

According to a further feature of the invention there is provided a process for the manufacture of the new azo dyestuffs, as hereinbefore defined, which comprises reacting cyanuric chloride or cyanuric bromide with an azo compound, which in the form of its free acid, is represented by the formula:

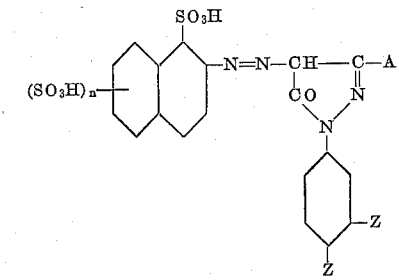

wherein A and $n$ have the meanings stated above, one Z represents a hydrogen atom or a sulphonic acid group and the other Z represents an —NHR group, wherein R has the meaning stated above, and the benzene nucleus may be substituted by atoms or groups other than hydroxy, amino or substituted amino groups.

This process of the invention may be conveniently carried out by adding an aqueous solution of the sodium salt of the azo compound to a suspension of the cyanuric chloride or cyanuric bromide in water or in a mixture of water and a water-miscible organic liquid, for example acetone, adding sodium carbonate to maintain the pH of the mixture at 7 and filtering off the azo dyestuff which is precipitated. If desired sodium chloride can be added to ensure complete precipitation of all the azo dyestuff.

The azo compounds used in this process of the invention may be obtained by diazotising an amine of the formula:

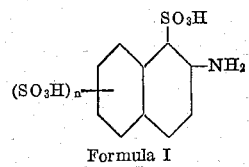

Formula I wherein $n$ has the meaning stated above, and coupling the diazo compound so obtained with a pyrazolone of the formula:

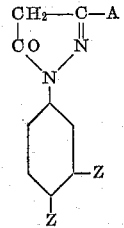

Formula II wherein A and Z have the meanings stated above, and the benzene nucleus may be substituted by atoms or groups other than hydroxy, amino and substituted amino groups.

As examples of the amines of Formula I which may be used to obtain the azo compounds used in this process of the invention there may be mentioned 2-naphthylamine 1:5-disulphonic acid, 2-naphthylamine 1:5:7-trisulphonic acid, 2-naphthylamine-1-sulphonic acid, 2-naphthylamine-1:6-disulphonic acid and 2-naphthylamine-1:7-disulphonic acid.

The pyrazolones of Formula II wherein A represents a carboxylic acid ester group may be obtained by heating the corresponding pyrazolone wherein A represents a carboxylic acid group with an excess of the appropriate alcohol in the presence of sulphuric acid or hydrochloric acid, making neutral with sodium carbonate, removing the excess alcohol by distillation, adding water and filtering off the pyrazolone which is precipitated.

The pyrazolones of Formula II wherein A represents a carbamyl or substituted carbamyl group may be obtained by heating the corresponding pyrazolone wherein A represents a carbethoxy group with an excess of ammonia or the appropriate amine and subsequently removing the excess ammonia or the amine. Alternatively the pyrazolones of Formula II wherein A represents an N-aryl substituted carbamyl group and R represents a hydrogen atom may be obtained by reacting a pyrazolone of the formula:

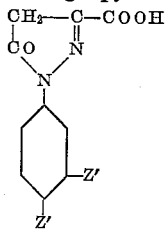

wherein one Z′ represents a hydrogen atom or a sulphonic acid group and the other Z′ represents a nitro group, and the benzene nucleus may be substituted by atoms or groups other than hydroxy, amino and substituted amino groups, with the appropriate arylamine in the presence of phosphorus oxychloride and subsequently converting the nitro group to an amino group.

As examples of pyrazolones of Formula II which may be used to obtain the azo compounds used in this process of the invention there may be mentioned 1-(3′-aminophenyl) - 3 - methyl-5-pyrazolone, 1-(3′-aminophenyl)-3-carboxy - 5 - pyrazolone, 1-(4′-aminophenyl)-3-methyl-5-pyrazolone, 1 - (3′-aminophenyl)-3-carbethoxy-5-pyrazolone, 1 - (3′ - amino-4′-sulphophenyl)-3-methyl-5-pyrazolone, 1-(3′-aminophenyl)-3-carbamyl, N-methylcarbamyl, N:N-dimethylcarbamyl, N-ethylcarbamyl, N:N-diethylcarbamyl, N-phenylcarbamyl, N-methyl-N-phenylcarbamyl,N-β-hydroxyethylcarbamyl or N:N-di(β-hydroxyethyl)carbamyl-5-pyrazolone, 1 - (4′-aminophenyl)-3-carbomethoxy, carbethoxy, carbopropoxy or carbophenoxy-5-pyrazolone, 1-(4-aminophenyl)-3-carbamyl, N-methylcarbamyl, N:N-dimethylcarbamyl, N-ethylcarbamyl, N-phenylcarbamyl, N-methyl-N-phenylcarbamyl or N-β-hydroxyethylcarbamyl-5-pyrazolone, 1-(2′-methyl-5′-aminophenyl)-3-methyl or -carboxy-5-pyrazolone, 1-(2′-chloro-5′-aminophenyl)-3-methyl or -carboxy-5-pyrazolone, 1-(3′-amino-4′-sulphophenyl)-3-methyl or -carboxy-5-pyrazolone, 1 - (4′-amino-2′-carboxyphenyl)-3-methyl or -carboxy-5-pyrazolone, 1 - (4′-amino-3′-sulphophenyl)-3-methyl or -carboxy-5-pyrazolone, 1-(4′-amino-3′-sulphophenyl)-3-methyl or -carboxy-5-pyrazolone, 1-(4′-amino-2′-methoxyphenyl)-3-methyl or -carboxy-5-pyrazolone and 1-(4′-methylaminophenyl)-3-carboxy-5-pyrazolone.

According to a further feature of the invention there is described an alternative process for the manufacture of the new azo dyestuffs, as hereinbefore defined, which comprises diazotising an amine of Formula I, as hereinbefore defined, and coupling the diazo compound so obtained with a coupling component of the formula:

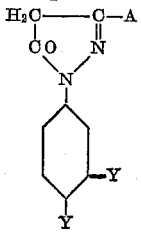

wherein A and Y have the meanings stated above, and the benzene nucleus may be substituted by atoms or groups other than hydroxy, amino or substituted amino groups.

This process of the invention may be conveniently carried out by adding sodium nitrite to a solution or suspension of the amine of Formula I in a dilute aqueous solution of hydrochloric acid, adding the diazo solution or suspension so obtained to an aqueous solution of the coupling component and filtering off the azo dyestuff which is precipitated. If desired sodium chloride can be added to ensure complete precipitation of all the azo dyestuff.

The coupling components used in this process of the invention may be obtained by treating a pyrazolone of Formula II with cyanuric chloride or with cyanuric bromide.

As examples of coupling components which may be used in this alternative process of the invention there may be mentioned 1-[3′- or 4′-(4″:6″-dichloro-1″:3″:5″-triazin-2″-ylamino)phenyl]-3-methyl-5-pyrazolone, 1-[3′- or 4′-(4″:6″-dichloro - 1″:3″:5″-triazin-2″-ylamino)phenyl]-3-carboxy-5-pyrazolone, 1-[3′- or 4′-(4″:6″-dichloro-1″:3″:5″-triazin-2″-ylamino)-4′- or 3′-sulphophenyl]-3-methyl-5-pyrazolone, 1-[3′- or 4′-(4″:6″-dichloro-1″:3″:5″ - triazin - 2″ - ylamino)-4′- or 3′-sulphophenyl]-3-carboxy-5-pyrazolone, 1-[3′- or 4′-(4″:6″-dichloro - 1″:3″:5″-triazin-2″-ylamino)phenyl]-3-carbomethoxy, carbethoxy, carbopropoxy or carbophenoxy-5-pyrazolone, 1-[3′- or 4′-(4″:6″-dichloro - 1″:3″:5″ - triazin - 2″-ylamino)-phenyl]-3-carbamyl, N-methylcarbamyl, N:N-dimethylcarbamyl, N - ethylcarbamyl, N:N - diethylcarbamyl, N-phenylcarbamyl, N-methyl - N - phenylcarbamyl, N-β-hydroxyethylcarbamyl or N:N-di(β-hydroxyethyl)carbamyl-5-pyrazolone, 1-(2′-methyl-5′ - (4″:6″-dichloro-1:3:5-triazin-2-ylamino)phenyl] - 3 - methyl or 3-carboxy-5-pyrazolone, 1-[2′-chloro-5′ - (4″:6″-dichlorotriazin-2″-ylamino)phenyl] - 3 - methyl- or 3-carboxy-5-pyrazolone, 1-[4′-(4″:6″-dichloro - 1″:3″:5″-triazin - 2″-ylamino)-2′-carboxyphenyl]-3-methyl- or 3-carboxy-5-pyrazolone, 1-[4′-(4″:6″-dichloro - 1″:3″:5″-triazin - 2″-ylamino)-2′-methoxyphenyl]-3-methyl or 3-carboxy-5-pyrazolone, 1-[4′-(4″:6″-dichloro-1″:3″:5″-triazin - 2″-yl-methylamino)phenyl]-3-carboxy - 5 - pyrazolone and 1-[3′-(4″:6″-dibromo - 1″:3″:5″-triazin - 2″-ylamino)phenyl]-3-carboxy-5-pyrazolone.

It is generally preferred to isolate the new azo dyestuffs, as hereinbefore defined, from the medium in which they have been formed at a pH from 6 to 8 and it has been found that the loss of halogen atoms from the triazine ring present in the dyestuffs can be reduced considerably by the addition of certain buffering agents which give a pH value between 6 and 8 and in particular by those which give a pH of about 6.5. The buffering agents may be added at any stage during the manufacture of the dyestuff but it is preferred to add the buffering agent just before the dyestuff is isolated and to subsequently dry the dyestuff in the presence of such a buffering agent. As examples of suitable buffering agents which can be used there may be mentioned mixtures of disodium hydrogen phosphate and sodium dihydrogen phosphate or potassium dihydrogen phosphate and mixtures of sodium diethylmetanilate and sodium hydrogen sulphate.

The new azo dyestuffs, as hereinbefore defined, are valuable for colouring cellulose textile materials, for example cotton, viscose rayon and linen textile materials. For colouring the cellulose textile materials the new azo dyestuffs, either singly or in the form of mixtures, may be applied by either a dyeing or a printing method, preferably in conjunction with a treatment with an acid-binding agent, for example by the methods disclosed in British Patent No. 797,946. When so applied to cellulose textile materials the new azo dyestuffs, as hereinbefore defined, yield greenish-yellow to orange shades possessing excellent fastness to wet treatments and to light.

Belgian Patent No. 558,957 describes and claims inter alia azo dyestuffs of the formula:

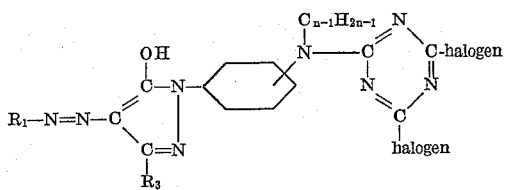

wherein $R_1$ represents a naphthalene nucleus containing at least one sulphonic acid group, $R_3$ represents a methyl, carboxy or modified carboxy group and $n$ is a positive whole number, which are obtained by condensing a cyanuric halide with azo compounds which are themselves obtained by coupling diazotised naphthylamine sulphonic acids with pyrazolones of the formula:

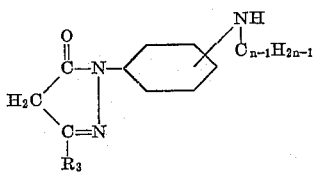

wherein $R_3$ and $n$ have the meanings stated above.

None of the dyestuffs of the present application are described in Belgian Patent No. 558,957 and there is no disclosure in this Belgian patent of the use of 2-naphthylamine 1-sulphonic acid or of 2-naphthylamine 1-sulphonic acid containing additional sulphonic acid groups as the diazo components. When compared with comparable dyestuffs of Belgian Patent No. 558,957 the dyestuffs of the present application give dyeings on cellulose textile materials which have superior light fastness.

The invention is illustrated but not limited by the following examples in which the parts and percentages are by weight:

Example 1

A solution of 59.9 parts of trisodium salt of the azo compound which is obtained by coupling diazotised 2-naphthylamine-1:5-disulphonic acid with 1-(3'-aminophenyl)-5-pyrazolone-3-carboxylic acid in 600 parts of water is added with stirring to a suspension of 18.8 parts of cyanuric chloride in a mixture of 140 parts of acetone, 400 parts of ice and 400 parts of water, the temperature being maintained between 0° and 3° C. The mixture is stirred for 1 hour and 50 parts of a 10% aqueous solution of sodium carbonate are then added. 22.5 parts of sodium diethylmetanilate, 1.5 parts of sodium hydrogen sulphate and 75 parts of sodium chloride are then added and the precipitated dyestuff is filtered off. The dyestuff paste so obtained is mixed with 11.25 parts of sodium diethylmetanilate and 0.75 part of sodium hydrogen sulphate and dried at 20° C.

On analysis the dyestuff composition so obtained is found to contain 1.89 atoms of organically bound chlorine for each molecule of dyestuff present. When applied to cellulose textile materials in conjunction with a treatment with an acid-binding agent the dyestuff yields golden-yellow shades possessing excellent fastness to light and to washing.

Example 2

In place of the 59.9 parts of the trisodium salt of the azo compound used in Example 1 there are used 54.7 parts of the disodium salt of the azo compound which is obtained by coupling diazotised 2-naphthylamine-1:5-disulphonic acid with 1-(3'-aminophenyl)-3-methyl-5-pyrazolone.

On analysis the dyestuff composition so obtained is found to contain 2.14 atoms of organically bound chlorine for each molecule of dyestuff present.

When applied to cellulose textile materials in conjunction with a treatment with an acid-binding agent the dyestuff yields golden yellow shades possessing excellent fastness to light and to washing.

Example 3

In place of the 59.9 parts of the trisodium salt of the azo compound used in Example 1 there are used 64.9 parts of the trisodium salt of the azo compound which is obtained by coupling diazotised 2-naphthylamine 1:5:7-trisulphonic acid with 1-(3'-aminophenyl)-3-methyl-5-pyrazolone.

On analysis the dyestuff composition so obtained is found to contain 1.86 atoms of organically bound chlorine for each molecule of dyestuff present. When applied to cellulose textile materials in conjunction with a treatment with an acid-binding agent the dyestuff yields golden yellow shades possessing excellent fastness to light and to washing.

The following table gives further examples of the new dyestuffs of the invention which are obtained by replacing the 59.9 parts of the trisodium salt of the azo compound used in Example 1 by an equivalent amount of the sodium salt of the azo compound which is obtained by diazotising the naphthylamine sulphonic acid listed in the second column of the table and coupling the diazo compound so obtained with the pyrazolone listed in the third column of the table. The fourth column of the table indicates the shades obtained when the dyestuffs are applied to cellulose textile materials in conjunction with a treatment with an acid-binding agent.

| Example | Naphthylamine sulphonic acid | Pyrazolone | Shade |
|---|---|---|---|
| 4 | 2-naphthylamine-1:5-disulphonic acid. | 1-(3'-amino-4'sulphophenyl)-3-methyl-5-pyrazolone. | Greenish-yellow. |
| 5 | do | 1-(4'-aminophenyl)-3-methyl-5-pyrazolone. | Golden-yellow. |
| 6 | do | 1-(4'-aminophenyl)-3-carboxy-5-pyrazolone. | Do. |
| 7 | 2-naphthylamine-1-sulphonic acid. | 1-(3'-amino-4'-sulphophenyl)-3-carboxy-5-pyrazolone. | Reddish-yellow. |
| 8 | 2-naphthylamine-1:5:7-trisulphonic acid. | 1-(3'-aminophenyl)-3-carbethoxy-5-pyrazolone. | Yellow. |
| 9 | 2-naphthylamine-1:6-disulphonic acid. | 1-(3'-aminophenyl)-3-carboxy-5-pyrazolone. | Do. |
| 10 | 2-naphthylamine-1:5:7-trisulphonic acid. | 1-(3'aminophenyl)-3-carbamyl-5-pyrazolone. | Do. |
| 11 | do | 1-(3'-aminophenyl)-3-N-methylcarbamyl-5-pyrazolone. | Do. |
| 12 | 2-naphthylamine-1:5-disulphonic acid. | 1-(4'-N-methylaminophenyl)-3-carboxy-5-pyrazolone. | Do. |

The 1-(3'-aminophenyl)-3-carbethoxy-5-pyrazolone used in Example 8 may be obtained in the form of its salt with hydrogen chloride by heating 1-(3'-aminophenyl)-3-carboxy-5-pyrazolone with ethanol which has been saturated with hydrogen chloride gas and subsequently removing the excess ethanol by distillation when the hydrochloride of 1-(3'-aminophenyl)-3-carbethoxy-5-pyrazolone (which melts at 210° C.) separates out and is filtered off and dried.

The 1-(3'-aminophenyl)-3-carbamyl-5-pyrazolone used in Example 10 may be obtained in the form of its salt with hydrogen chloride by heating 1-(3'-aminophenyl)-3-carbethoxy-5-pyrazolone with a 20% aqueous solution of ammonium hydroxide in an autoclave at a temperature of 80° C. cooling the mixture so obtained, adding a concentrated aqueous solution of hydrochloric acid until the mixture is acid to Congo Red and filtering off the precipitated hydrochloride of 1-(3'-aminophenyl)-3-carbamyl-5-pyrazolone (which melts at 250° C.).

The 1-(3'-aminophenyl)-3-N-methylcarbamyl-5-pyrazolone used in Example 11 may be obtained in the form of its hydrochloride by replacing the 20% aqueous solution of ammonium hydroxide used for the preparation of 1-(3'-aminophenyl)-3-carbamyl-5-pryrazolone by a 20% aqueous solution of methylamine.

Example 13

A solution of 4.7 parts of 1-(3'-aminophenyl)-3-methyl-5-pyrazolone in a mixture of 100 parts of water and 100 parts of acetone is added, over 30 minutes, with stirring to a suspension of 8.75 parts of cyanuric bromide in a mixture of 100 parts of dioxan, 150 parts of ice and 150 parts of water. The mixture is then stirred for 1 hour at a temperature between 5° and 10° C. whilst maintaining the pH of the mixture between 6 and 8 by the addition of 10% aqueous solution of sodium carbonate. 20 parts of sodium carbonate are then added followed by an aqueous suspension of diazotised 2-naphthylamine-1:5-disulphonic acid (which is obtained by adding sodium nitrite to a suspension of 7 parts of 2-naphthylamine-1:5-disulphonic acid in a dilute aqueous solution of hydrochloric acid) and the mixture so obtained is then stirred for 2 hours at a temperature between 5° and 10° C. The pH of the mixture is then raised to 7 by the addition of a concentrated aqueous solution of hydrochloric acid and 5.5 parts of sodium diethylmetanilate, 0.4 part of sodium hydrogen sulphate and 40 parts of sodium chloride are added. The precipitated dyestuff is then filtered off, the dyestuff paste so obtained is mixed with 2.81 parts of sodium diethylmetanilate and 0.18 part of sodium hydrogen sulphate and the mixture is then dried.

When applied to cellulose textile materials in conjunction with a treatment with an acid-binding agent the dyestuff yields golden yellow shades possessing excellent fastness to light and to washing.

What we claim is:

Azo dyestuffs which, in the form of the free acids, are represented by the formula:

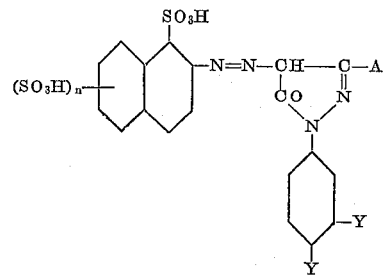

wherein:

$n$ represents one of the numbers 0, 1, and 2;

A represents a member selected from the group consisting of lower alkyl, carboxyl, carbo lower alkoxy, carbamyl, lower alkyl carbamyl;

one Y represents a member selected from the group consisting of hydrogen and —$SO_3H$, and the other Y represents a group of the formula:

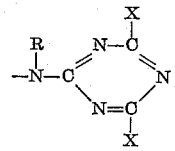

wherein:

R represents a member selected from the group consisting of hydrogen and lower alkyl;

X represents a halogen atom selected from the group consisting of chlorine and bromine.

References Cited in the file of this patent

UNITED STATES PATENTS

| | | |
|---|---|---|
| 2,892,829 | Stephen | June 30, 1959 |
| 2,951,070 | Stephen et al. | Aug. 30, 1960 |
| 2,951,071 | Tilley | Aug. 30, 1960 |

FOREIGN PATENTS

| | | |
|---|---|---|
| 558,957 | Belgium | Jan. 4, 1958 |
| 200,687 | Austria | Nov. 25, 1958 |